(12) United States Patent
Gataric

(10) Patent No.: US 12,143,017 B2
(45) Date of Patent: Nov. 12, 2024

(54) ENERGY ACCUMULATOR APPARATUS AND ASSOCIATED METHODS

(71) Applicant: GE AVIATION SYSTEMS LLC, Grand Rapids, MI (US)

(72) Inventor: Slobodan Gataric, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 179 days.

(21) Appl. No.: 17/876,771

(22) Filed: Jul. 29, 2022

(65) Prior Publication Data
US 2024/0039409 A1    Feb. 1, 2024

(51) Int. Cl.
H02M 3/158    (2006.01)
H02M 1/00    (2006.01)

(52) U.S. Cl.
CPC ....... H02M 3/1582 (2013.01); H02M 1/0077 (2021.05)

(58) Field of Classification Search
CPC .. H02M 1/0077; H02M 1/0067; H02M 1/007; H02M 3/1582; H02M 3/1574; H02M 3/18; H02M 3/158; H02M 3/156; H02M 3/155
See application file for complete search history.

(56) References Cited

U.S. PATENT DOCUMENTS

| | | | |
|---|---|---|---|
| 7,327,113 B2 | 2/2008 | Steigerwald et al. | |
| 7,952,231 B1 * | 5/2011 | Zansky | H02J 7/34 307/44 |
| 8,138,694 B2 | 3/2012 | Steigerwald et al. | |
| 9,092,207 B2 * | 7/2015 | Zai | G06F 1/266 |
| 10,443,511 B2 | 10/2019 | Ethier et al. | |
| 11,008,950 B2 | 5/2021 | Ethier et al. | |
| 11,167,654 B2 | 11/2021 | King et al. | |
| 2021/0079900 A1 | 3/2021 | Oonishi | |
| 2022/0052597 A1 | 2/2022 | Yao | |

FOREIGN PATENT DOCUMENTS

| | | |
|---|---|---|
| CN | 207234674 U | 4/2018 |
| CN | 108667337 A | 10/2018 |
| CN | 110445363 A | 11/2019 |
| CN | 106787707 B | 5/2020 |
| CN | 114362524 A | 4/2022 |

OTHER PUBLICATIONS

English translation CN 110445363A (Year: 2024).*

* cited by examiner

Primary Examiner — Nguyen Tran
(74) Attorney, Agent, or Firm — McGarry Bair PC

(57) ABSTRACT

An energy accumulator module (EAM) is coupleable electrically in parallel between a power source and an electrical load via a first transmission line and a second transmission line, to receive a DC voltage from the power source. The EAM includes a power converter having inductor coupled at a first end to the first transmission line, and at a second end to a node, a switching stage including a buck leg and a boost leg, and a capacitor coupled electrically in series between the boost leg and the second transmission line. A controller module is configured to control the switching stage to operate in one of a charge mode to charge the capacitor, and a discharge mode to provide a current to the first transmission line.

14 Claims, 5 Drawing Sheets

ENERGY ACCUMULATOR APPARATUS AND ASSOCIATED METHODS

BACKGROUND

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide voltage step-up or step-down power conversion, direct current (DC) to alternating current (AC) power conversion or AC to DC power conversion, or AC to AC power conversion involving changes in frequency or phase, or switching operations to selectively enable or disable the delivery of power to particular electrical loads, depending on, for example, available power distribution supply, criticality of electrical load functionality, or aircraft mode of operation, such as take-off, cruise, or ground operations. In some cases, the electrical system can also include an electrical accumulator unit to supplement the generator output power to provide transient performance and an electric start during an engine failure.

DETAILED DESCRIPTION

Figure 1:
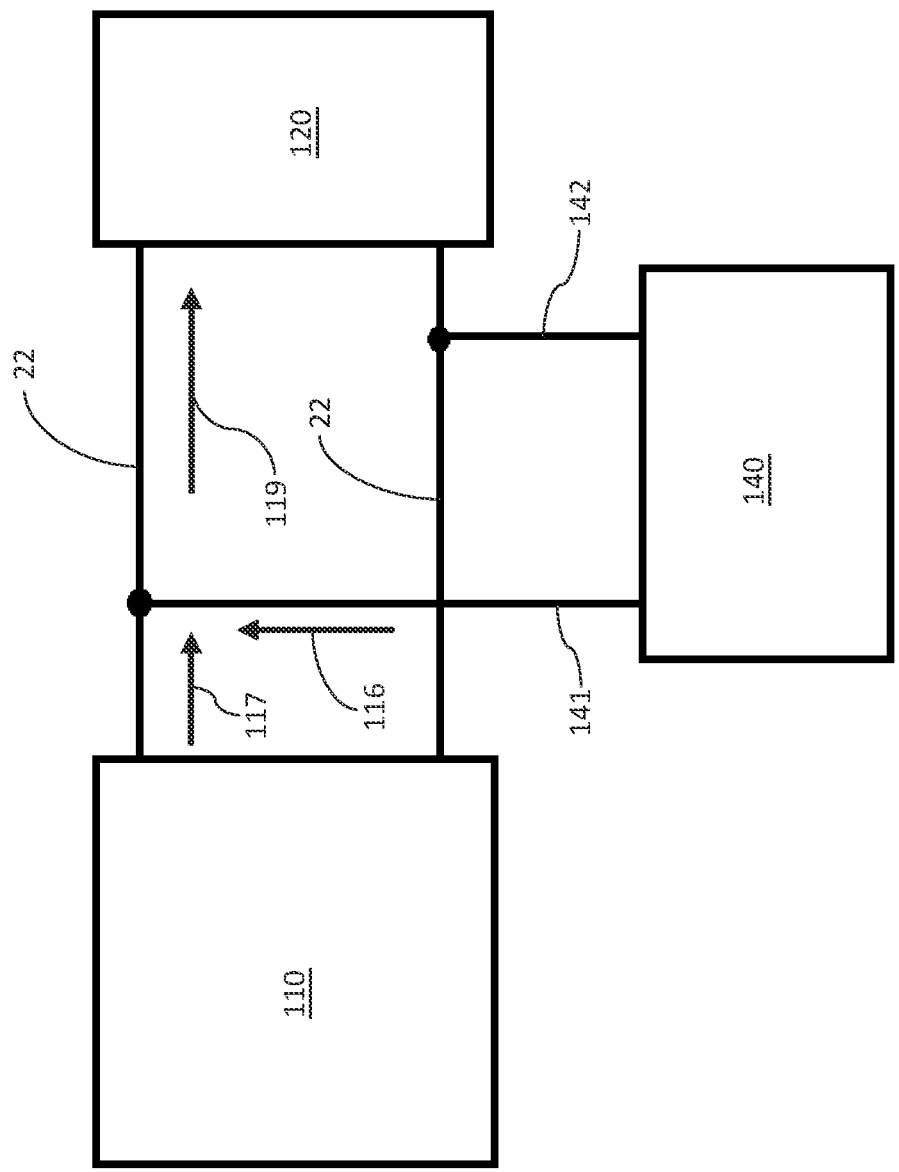
FIG. 1 illustrates an example schematic view of a power distribution system including an energy accumulator module in accordance with various aspects described herein.

The described aspects of the present disclosure are directed to an electrical power distribution system or power distribution node for an aircraft, which enables production and distribution of electrical power, such as from a gas turbine engine driven generator, to the electrical loads of the aircraft. It will be understood that while aspects of the disclosure are shown or described for in-situ use in an aircraft environment, the disclosure is not so limited and has general application to electrical power systems in non-aircraft applications, such as other mobile applications and non-mobile industrial, commercial, and residential applications.

While "a set of" various elements will be described, it will be understood that "a set" can include any number of the respective elements, including only one element. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Non-limiting aspects of the disclosure are directed to controlling or regulating the delivering, supplying, providing, or the like, of power from a source to an electrical load.

As used herein, a "system" or a "controller module" can include at least one processor and memory. Non-limiting examples of the memory can include Random Access Memory (RAM), Read-Only Memory (ROM), flash memory, or one or more different types of portable electronic memory or any suitable combination of these types of memory. The processor can be configured to run any suitable programs or executable instructions designed to carry out various methods, functionality, processing tasks, calculations, or the like, to enable or achieve the technical operations or operations described herein.

While described herein as comprising separate elements, in non-limiting aspects, such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While software or "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module.

Aspects of the disclosure can be employed in any electrical circuit environment comprising a power source delivering power to a load. One non-limiting example of such an electrical circuit environment can be an aircraft power system architecture, which enables production of electrical power from at least one spool of a turbine engine, and delivers the electrical power through a power converter to a set of electrical loads. A typical power converter is a power supply or power processing circuit that converts an input voltage into a specified output voltage. A controller can be associated with the power converter to control an operation thereof by selectively controlling the conduction periods of switches employed therein. The switches employed by the power converter are typically semiconductor switching devices (e.g., MOSFETs). Although various non-limiting aspects are depicted and described herein using various semiconductor switching devices such as MOSFETS, other aspects are not so limited. Other non-limiting aspects can include any desired switching device that can switch a state between a low resistance state and a high resistance state in response to an electrical signal. For example, the switching devices in various aspects can comprise, without limitation, any desired type of switching element including for example, transistors, gate commutated thyristors, field effect transistors (FETs), insulated-gate bipolar transistors (IGBT) s, MOSFETs, and the like.

For conventional power systems, there is an increasing need to support pulsating electrical loads, resulting in more complex and costly systems due to rapid switching in the pulsing load. In particular, typical pulsating loads, such as phase controlled SCR loads and switched mode power supply (SMPS) loads, for example, can call for or demand a load current from a power generation system (e.g., a generator) that can vary randomly or on a repetitive basis resulting in larger output steps with increasing load current slew rates. In such instances, the rate of a change of the current required or demanded by the load (i.e., the load current demand) can exceed an available rate of change of a source current provided by the generator (i.e., the available source current), for example due to inertia or other physical characteristics associated with the generator. This difference between the load current demand and the available source current can result in load input voltage dips or sags in proportion to the applied load. These voltage dips due to the pulsing load can result in harmonic distortion, or transient voltage impulses In response, conventional active rectification schemes are often employed due to their improved control bandwidth and resultant improved transient response. However, active rectification has some drawbacks, such as decreased efficiency due to ever present switching losses. Additionally, active rectification schemes typically require additional gate drive devices and semiconductor switching devices to handle large full load currents, resulting in increased system costs and complexity. Furthermore, such active rectification can result in added control circuit complexity when operating under short circuit conditions.

Aspects as disclosed herein can provide a simpler, lower cost, and more efficient solution compared to active rectification and other techniques by providing an energy accumulator module cooperative with a power generator system to provide a current to a load during transient periods of high demand. For example, in some instances, aspects as disclosed herein can provide a current to the load having an AC component that is outside of the bandwidth of the generator. Additionally, aspects as disclosed herein can provide an improved performance and transient response compared to diode rectification and other conventional techniques.

The exemplary drawings are for purposes of illustration only and the dimensions, positions, order and relative sizes reflected in the drawings attached hereto can vary FIG. 1 illustrates a simple schematic depiction of a non-limiting aspect of a power distribution system 100. A power source 110 can be electrically coupled to an electrical load 120 via a set of electrically conductive power distribution bus 22. An energy accumulator module (EAM) 140 can be coupled to the power distribution bus 22 via a first transmission line 141 and a second transmission line 142, respectively. The EAM 140 can be electrically coupled in parallel with the electrical load 120. A first current 116 can be arranged to flow in the first transmission line 141. The power source 110 can output or provide a second current 117 to the electrical load 120 via the power distribution bus 22. As illustrated, the power source 110 and EAM 140 can cooperatively provide a load current 119 to the load via the power distribution bus 22. As will be described in more detail herein, although FIG. 1 depicts the first current 116 schematically as an arrow having a particular direction that is indicative of a direction of current flow, in aspects, the first current 116 can be arranged to selectively flow in an opposite direction (e.g., toward the EAM 140) than is shown in FIG. 1. Regardless of the type of electrical load 120, the power source 110 can be configured, adapted, selected, or the like, to provide power to the electrical load 120. In this sense, the power can include different electrical characteristics, including, but not limited to, voltage levels, current amounts, power type (e.g. AC or DC), frequency, or a combination thereof.

Figure 2:
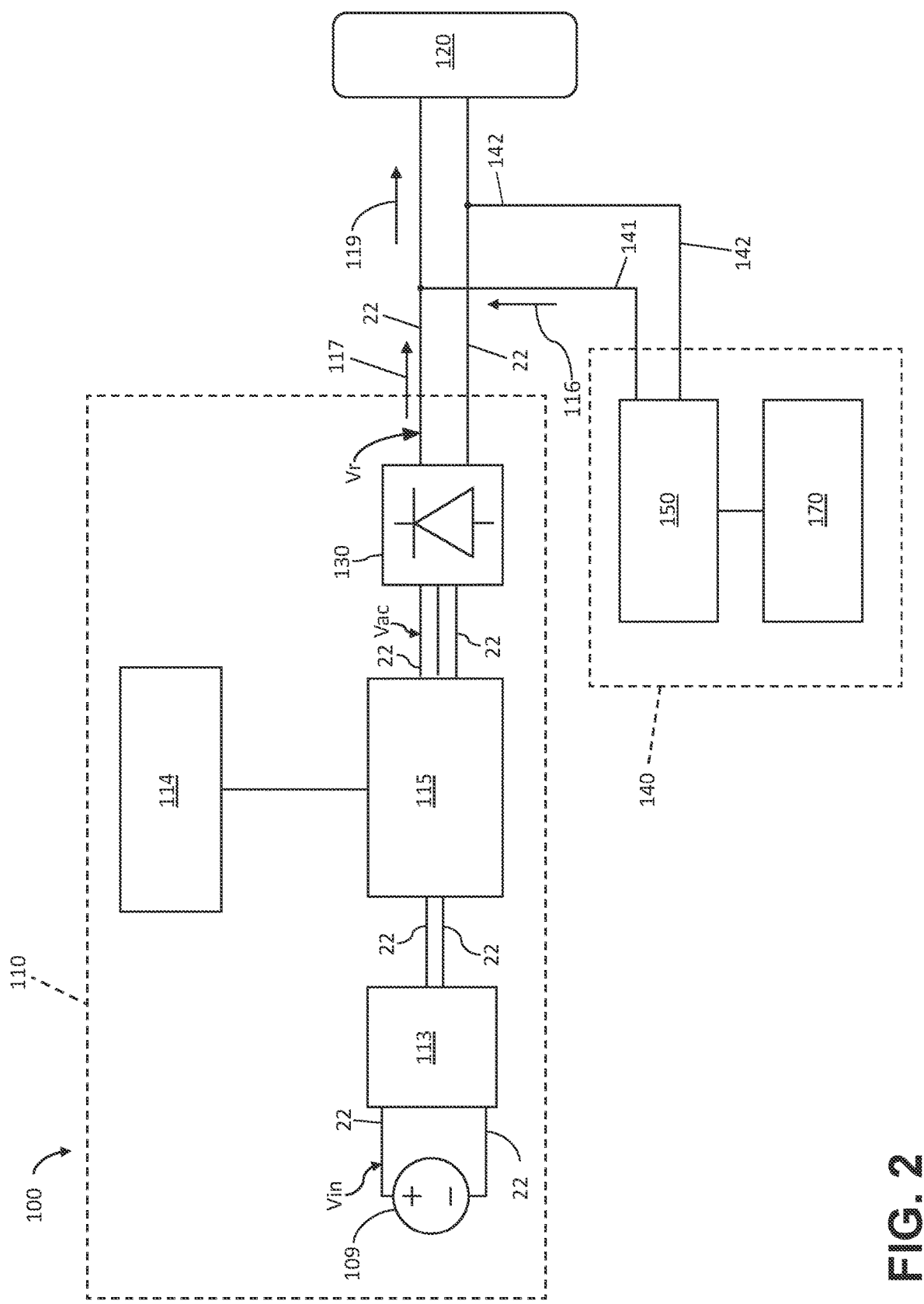
FIG. 2 illustrates a more detailed schematic view of the power distribution system of FIG. 1, in accordance with various aspects described herein.

FIG. 2 illustrates a more detailed schematic view of another power distribution system 100, coupled to the electrical load 120 to provide the load current 119 thereto via the set of power distribution bus 22, in accordance with non-limiting aspects described herein. The power distribution system 100 can include the power source 110 and the EAM 140. The EAM 140 can include a power converter 150 and a controller module 170. In non-limiting aspects, the power source 110 can include an AC generator 115, a prime mover or generator driver 114 (e.g., a motor), a DC power source 109 (e.g., a battery, a rectifier, or the like), an exciter 113, and a rectifier 130. The DC power source 109 can be electrically coupled to the exciter 113 to provide a DC voltage Vin thereto. The exciter 113 can be electrically coupled to the generator 115 to provide a field current to a rotor winding of the generator 115. The generator driver 114 can be coupled to the generator 115 to drive the generator 115 to thereby produce an AC voltage Vac at an output of the generator 115.

As illustrated, the AC input voltage Vac can be a 3-phase AC input voltage Vac. However, other aspects are not so limited, and the AC input voltage Vac can comprise any desired number of phases, including single-phase, and have any desired frequency. The AC voltage Vac can be provided to an input of the rectifier 130 via the power distribution bus 22. The rectifier 130 is configured to convert or rectify the AC input voltage Vac to a rectified or DC voltage Vr. The rectifier 130 can provide the DC voltage Vr at an output of the rectifier 130 to the power distribution bus 22. EAM The EAM 140 can be electrically coupled with the rectifier 130 to receive the rectified DC voltage Vr therefrom. For example, a pair of power distribution bus 22 conductors can be coupled at an output of the rectifier 130 to receive the rectified voltage Vr therefrom, and the first and second transmission lines 141, 142 can be coupled to a respective power distribution bus 22. In this way, the rectified voltage can be defined across the first and second transmission lines 141, 142

As illustrated, the rectifier 130 can be a diode-type rectifier 130. However, other aspects are not so limited, and the rectifier 130 can be arranged using a conventional rectifier device such as thyristors or semiconductor diodes, alone or in combination with other devices, to convert the AC input voltage Vac to the rectified DC voltage Vr. Additionally, in various non-limiting aspects, the rectifier 130 can optionally be configured as a single-phase rectifier or as a poly-phase rectifier (e.g., a three-phase rectifier), and can be further configured to provide half-wave or full wave rectification, as desired.

The operation of the power converter 150 can be controllable by the controller module 170. As will be described in more detail herein, based on control signals (not shown) received from the controller module 170, the power converter 150 can selectively operate in one of a charge mode and a discharge mode. In non-limiting aspects, when the power converter 150 is operating in the discharge mode, the first current 116 will flow in the first transmission line 141 toward the electrical load 120, as depicted in FIG. 2. Conversely, in non-limiting aspects, when the power converter 150 is operating in the charge mode, the first current 116 will flow in the first transmission line 141 toward the power converter 150, that is, in the opposite direction depicted in FIG. 2.

While FIG. 2 depicts a single power source 110 and EAM 140 coupled to a single respective electrical load 120, other aspects are not so limited. In non-limiting aspects, one or more power sources 110, EAMs 140, electrical loads 120, or combinations thereof, can be included without departing from the scope of the disclosure. The illustration is merely one non-limiting example configuration of the power distribution system 100. While the electrical load 120 is described herein in the context of a pulsating electrical load, it is contemplated that aspects as described herein are not limited by the electrical load type. In various non-limiting aspects, the electrical load 120 can optionally include, without limitation, a resistive load, a resistor-capacitor load, an inductive load, a switching load, a pulsating load, and combinations thereof. The electrical load 120 can consume power in at least two different operating schemas: normal (or continuous) operation, wherein the quantity or amount of power consumed is generally predictable and consistent, and transient periods of operation, wherein the quantity of power is generally temporal, pulsating, or temporary. The transient periods of operation can originate from particular load operating conditions.

Additionally, while FIG. 2 depicts by way of non-limiting example, a particular arrangement with an exciter 113 arranged to provide a field current to the rotor winding of the generator 115, other aspects are not so limited. In other non-limiting aspects, power source 110 can include a shunt or self-excited type exciter 113, or can include a conventional excitation boost system (EBS), permanent magnet generator (PMG), auxiliary winding type, or the like, without departing from the scope of the disclosure. Additionally, or alternatively, non-limiting aspects can also include an automatic voltage regulator (not shown) to supply DC output to the exciter stator.

While the controller module 170 is illustrated in FIG. 2 as proximal to the power converter 150, and the electrical load 120, this need not necessarily be the case. In non-limiting aspects, the power converter 150 can be disposed proximal to the electrical load 120, while the controller module 170 can disposed remotely from the electrical load 120 and the power converter 150.

In some instances, the electrical load 120 can operate with a high-power transient current demand. For example, the electrical load 120 can operate necessitating a rapid rate of rise of the load current 119 which can temporarily exceed the ability of the power source 110 to supply the full amount of current demanded by the electrical load 120. Such a transient load current demand (e.g., when the load current demand is increasing faster than the second current 117 is rising) can result in an undesired a drop, dip, or sag in the rectified DC voltage Vr at the electrical load 120. The voltage drop can result in undesirable consequences, including but not limited to, reduced performance of the electrical load 120, causing the electrical load 120 to operate outside of expected functionality.

However, as will be described in more detail herein, during such high power transient current demand events that exceed the ability of the power source 110 to supply the full amount of current demanded by the electrical load 120, aspects of the EAM 140 can be controllable by the controller module 170 to selectively operate in the discharge mode to provide the first current 116 to augment or supplement the second current 117. The EAM 140 can enable the power system 100 to supply the full amount of current demanded by the electrical load 120 during the event. In non-limiting aspects, when the EAM 140 is operating in the discharge mode, the first current 117 will flow in the first transmission line 141 in the direction depicted in FIG. 2, i.e., toward the electrical load 120.

Conversely, in some instances, an operation of the electrical load 120 can exhibit a transient current demand associated with a rapid drop of the load current which can temporarily exceed the ability of the power source 110 to timely reduce the second current 117 provided to the electrical load 120. Such a transient load current demand (e.g., when the load current demand is decreasing faster than the second current 117 provided by the power source 110 is dropping) can result in undesirable consequences, including but not limited to, reduced performance of the electrical load 120, causing the electrical load 120 to operate outside of expected functionality.

However, as will be described in more detail herein, during such transient current demand events when the load current demand is decreasing faster than the second current 117 is dropping, aspects of the EAM 140 can be controllable by the controller module 170 to selectively operate in the charge mode in which a portion of the second current 117 is provided to the EAM 140 as the first current 116. For example, based on control signals (not shown) received from the controller module 170, the power converter 150 can selectively operate in the charge mode, to receive the first current 116 to charge a power storage device (not shown) in the power converter 150. When the power converter 150 is operating in the charge mode, the first current 116 will flow in the first transmission line 141 in the opposite direction depicted in FIG. 2, that is, toward the power converter 150.

In still other instances, the electrical load 120 can be operating within the ability of the power source 110 to timely supply the full amount of current demanded by the electrical load 120 (i.e., when the second current 117 is at least equal to the load current 119 in all frequencies). In such instances, when the power storage device (not shown) in the power converter 150 is fully charged, the operation of the EAM 140 can be further controllable by the controller module 170 to selectively operate in an open or neutral mode in which the first current 116 cut off.

Figure 3:
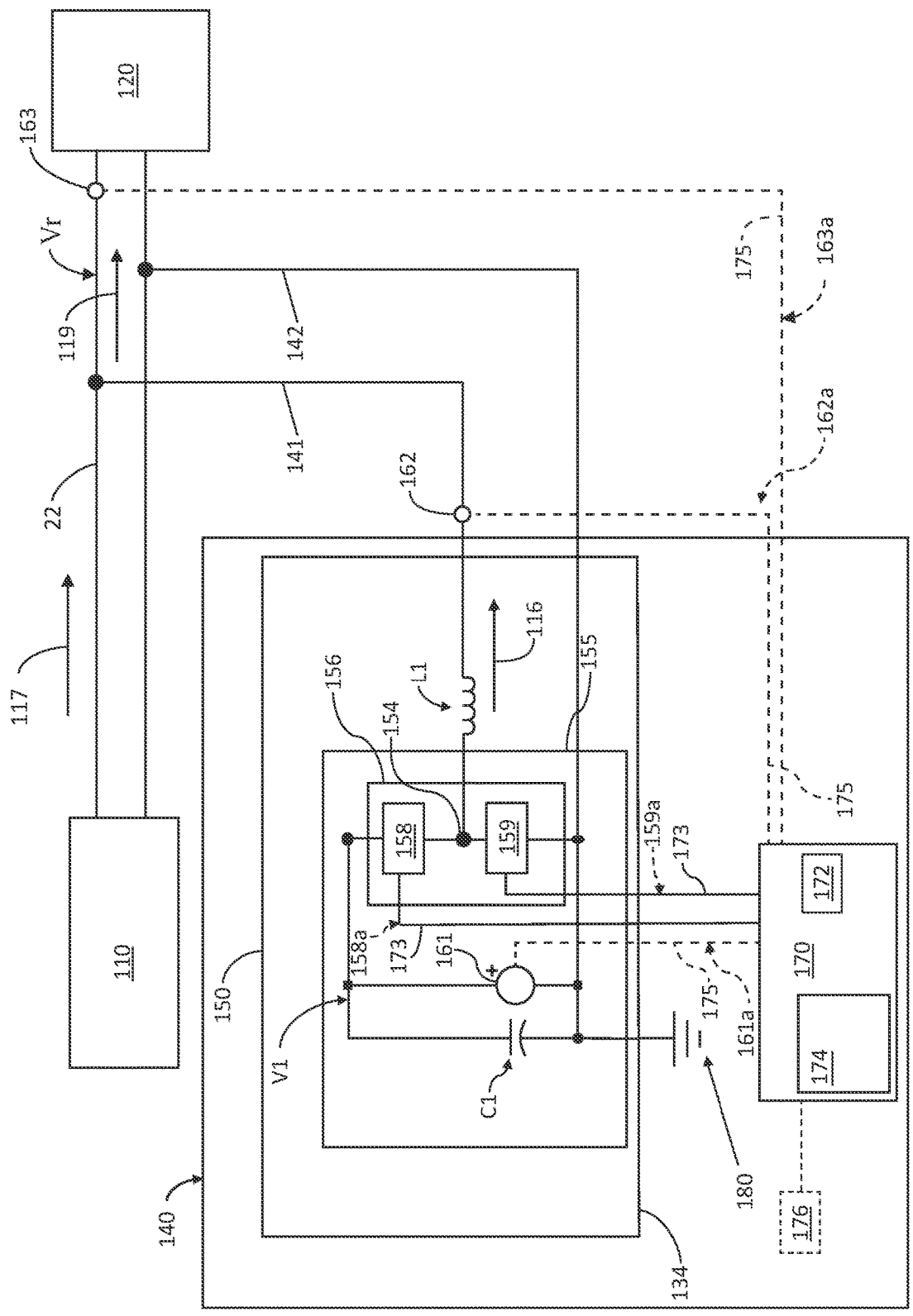
FIG. 3 illustrates another schematic view of the power distribution system of FIG. 2, with the energy accumulator module operating in discharge mode in accordance with various aspects described herein.

FIG. 3 illustrates a more detailed schematic view of a non-limiting aspect of the EAM 140 of FIG. 2. As shown, the controller module 170 can be communicatively coupled to the power converter 150 via a set of control lines 173 to control an operation thereof. The controller module 170 can include a processor 172 and memory 174. A set of sensors can be communicatively coupled with the controller module 170 via a set of communication lines 175. In non-limiting aspects, the set of sensors can include a first sensor 161, a second sensor 162, and a third sensor 163. The power converter 150 can include a switching stage 156 electrically coupled to a capacitor C1 and an inductor L1. For example, the inductor L1 can be coupled at a first end to the switching stage 156 at a node 154, and coupled at a second end to the first transmission line 141. In non-limiting aspects, the capacitor C1, the inductor L1 and switching stage 156 can cooperatively define a DC-DC converter 155. The DC-DC converter 155 can be electrically coupled electrically in parallel between the first and second transmission lines 141, 142. It will be appreciated that while FIG. 3 depicts the second transmission line 142 coupled to ground 180, this need not be the case. In other non-limiting aspects, the second transmission line can be floating with respect to ground without departing from the disclosure herein.

In non-limiting aspects, the DC-DC converter 155 can be a buck-boost DC-DC converter, such as a bi-directional buck-boost converter. In non-limiting aspects, the DC-DC converter 155 can be a half-bridge type DC-DC converter. For example, the switching stage 156 can include a high side switch or boost leg 158, and a low side switch or buck leg 159. The boost leg 158 and buck leg 159 can be coupled together at the node 154. The capacitor C1 can be coupled electrically in series between the boost leg 158 and the second transmission line 142. The buck leg 159 can be coupled electrically in series between the node 154 and the second transmission line 142. For example, in some non-limiting aspects, the second transmission line 142 can optionally be coupled to ground 180, the buck leg 159 can thus be coupled electrically in series between the node 154 and ground 180, while the capacitor C1 can be coupled electrically in series between the boost leg 158 and ground 180. A first voltage V1 across the capacitor C1 can be equal to or based on the rectified DC voltage Vr.

Non-limiting examples of the set of sensors 161, 162, 163 can include a current sensor, a voltage sensor, or the like, arranged, adapted, or otherwise configured in various combinations to sense or measure a respective predetermined parameter such as an amount of power, voltage, current, or combinations thereof. The set of sensors 161, 162, 163 can be communicatively coupled to the controller module 170 via respective communication line 175 to provide a corresponding signal indicative of a value of the respective sensed parameter to the controller module 170. The communication lines 175 can be wired or wireless communication lines. For example, as illustrated, in non-limiting aspects, the first sensor 161 can comprise a voltage sensor arranged to sense a first voltage V1 across the capacitor C1. The second sensor 162 can comprise a current sensor arranged to sense the first current 116. In non-limiting aspects, the first current 116 can be a current through the inductor L1. The third sensor 163 can comprise a current sensor arranged to sense the load current 119 in the power distribution bus 22.

For example, the controller module 170 can receive, via a respective communication line 175, one or more of a first signal 161*a* indicative of a value of the first voltage V1 across the capacitor C1, a second signal 162*a* indicative of a value of the first current 116, and a third signal 163 *a* indicative of a value of the load current 119. In other aspects, one or more sensors can be used to sense a desired predetermined parameter or value such as, without limitation, an amount of power, voltage, current, frequency, or combinations thereof and to provide a corresponding signal indicative of the respective sensed parameter to the controller module 170.

The memory 174 can be communicatively coupled with the set of sensors 160. In this sense, the set of sensors 160 can provide, or the controller module 170 can obtain, a respective signal indicative of the predetermined sensed parameters. In one non-limiting aspect, the controller module 170 can optionally be further communicatively coupled with another power or system controller 176 remote from the EAM 140. In one non-limiting example, the system controller 176 can be adapted, enabled, or otherwise configured to controllably operate the controller module 170 or aspects of the EAM 140. For instance, the system controller 176 can include additional information of operational characteristic values pertinent to the EAM 140, the power source 110, or the electrical load 120. For instance, in the non-limiting example of an aircraft environment, the system controller 176 can include additional information of operational characteristic values pertinent to control schema aspects related to the flight phase or environmental operating characteristic of the aircraft, which may affect the energizing of the electrical load 120.

In non-limiting aspects, the controller module 170 can be configured to control an operation of the switching stage 156 based on the value of the sensed or measured parameters. For example, in one non-limiting aspect, the controller module 170 can be configured to control an operation of the switching stage 156 based on the measured value the first voltage V1, the measured value of the first current 116, and a measured value of the load current 119.

Additionally, or alternatively, in non-limiting aspects, the controller module 170 can be configured to control an operation of the switching stage 156 based on a comparison of, or difference between, the value of one measured parameter with the value of another measured parameter.

Non-limiting aspects of the power control circuit 105 can include operations wherein, for example, predetermined parameters can be sensed or measured by the set of sensors 161, 162, 163 and provided via the communication lines 175 to the controller module 170. The controller module 170, processor 172, or system controller 176 can be configured to determine a respective value for the predetermined parameters. In some aspects, controller module 170, processor 172, or system controller 176 can be configured to determine a comparison of, or difference between, the value of one measured parameter with the value of another measured parameter.

Based on the determined respective values of the sensed or measured parameters, the controller module 170 can be configured to selectively operate the switching stage 156 in one of the charge mode and discharge mode by switchably controlling the duty cycle of the boost leg 158 and the buck leg 159.

The direction of the first current 116 when the EAM 140 is operating in the charge mode is opposite the direction of the first current 116 when the EAM 140 is operating in the discharge mode. As such, the EAM 140 can operate in only one of the charge mode or discharge mode at a given time. When the EAM 140 is operating in the discharge mode, the direction of the first current is toward the electrical load 120, and thus the load current 119 can be a sum of the second current 117 and first current 116. When the EAM 140 is operating in the charge mode, the direction of the first current 116 is reversed from the discharge mode (i.e., away from the electrical load 120) and the first current 116 can be equal to a difference between the load current 119 and the second current 117. When the EAM 140 is operating in the charging mode, the switching stage 156 can be arranged to selectively provide the first current 116 to the capacitor C1 from the first transmission line 141 via the boost leg 158.

When the EAM 140 is operating in the discharge mode, the switching stage 156 can be arranged to selectively provide or inject the first current 116 (e.g., an injection current) to the first transmission line 141 via the node 154 based on energy stored in the capacitor C1. In non-limiting aspects, the first current 116 can include a low-frequency AC component.

The controller module 170 can be configured to provide a signal (e.g. one or more gate signals) via control lines 173 to the switching stage 156 to switchably operate the switching stage 156 in the discharge mode.

The controller module 170 can be further configured to provide a signal (e.g. one or more gate signals) via control lines 173 to the switching stage 156 to switchably operate the switching stage 156 in the charge mode. In response to the switching stage 156 operation in the charging mode, the DC-DC converter 155 can provide the first current 116 to the capacitor C1, from the first transmission line 141 via the node 154.

Figure 4:
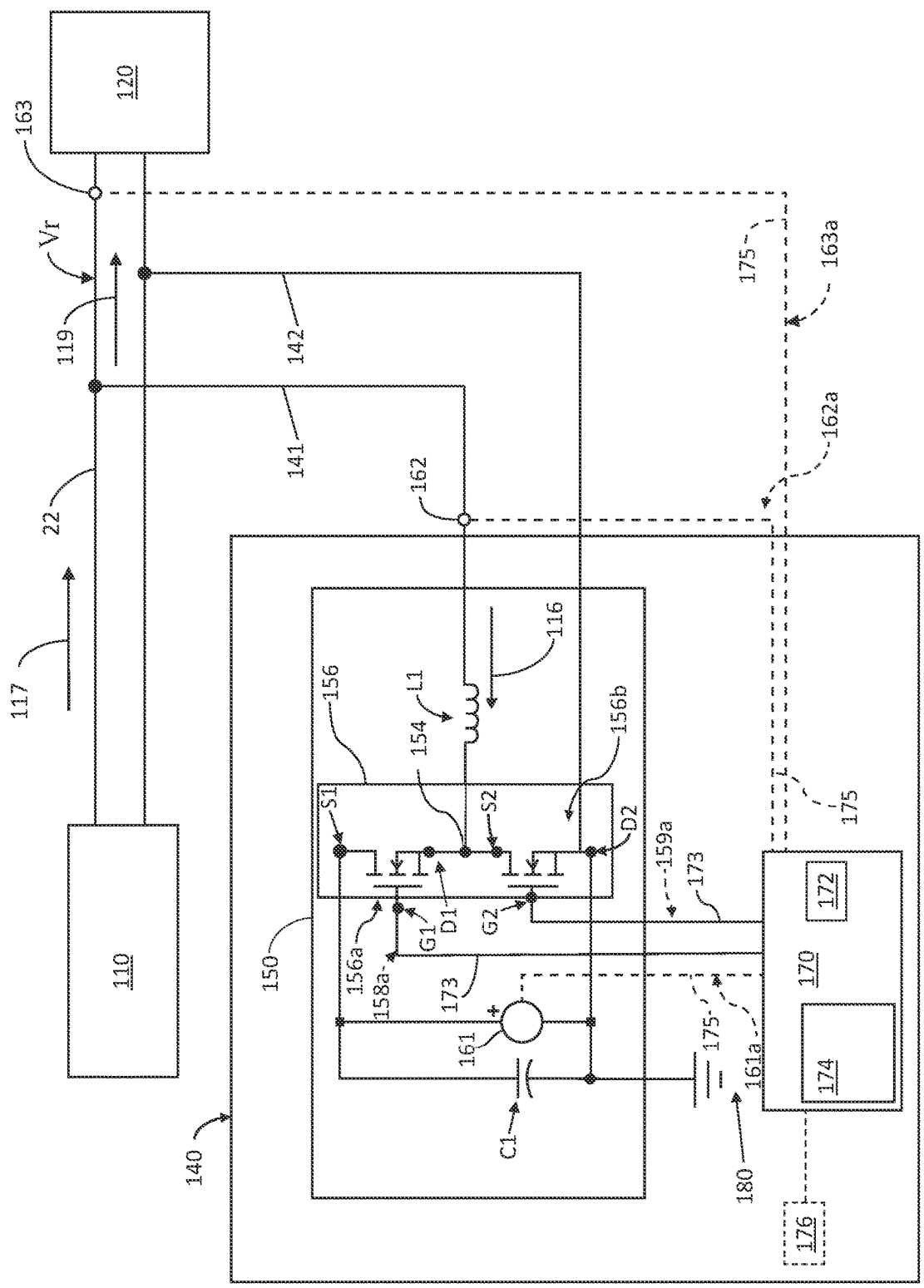
FIG. 4 illustrates another example schematic view of the power distribution system of FIG. 2, with the energy accumulator module operating in a charge mode in accordance with various aspects described herein.

FIG. 4 illustrates a more detailed schematic view of a non-limiting aspect of the EAM 140. The EAM 140 depicted in FIG. 4 is similar to the arrangement as described with respect to FIG. 3, except in this non-limiting aspect, the boost leg 158 is illustrated as comprising a first semiconductor switching device 156a (e.g., a MOSFET device) and the buck leg 159 is illustrated as comprising a second semiconductor switching device 156b (e.g., a MOSFET device). Other non-limiting aspects can include any desired switching device that can switch a state between a low resistance state and a high resistance state in response to a signal from the controller module 170 via the control lines 173. For example, the first and second semiconductor switching devices 156a, 156b in various aspects can comprise, without limitation, any desired type of switching element including for example, transistors, gate commutated thyristors, field effect transistors (FETs), or insulated-gate bipolar transistors (IGBTs).

The first semiconductor switching device 156a can comprise a first source terminal S1, first gate terminal G1, and first drain terminal D1. Likewise, the second semiconductor switching device 156b can comprise a second source terminal S2, second gate terminal G2, and second drain terminal D2. As shown, the drain terminal D1 of the first semiconductor switching device 156a is electrically coupled to the second source terminal S2 of the second semiconductor switching device 156b to define the node 154. In non-limiting aspects, the node 154 can operate as an output neutral or single-phase AC output node or terminal. The gate terminals G1, G2 of the respective first and second semiconductor switching devices 156a, 156b can be communicatively coupled to the controller module 170 via the control lines 173. In other non-limiting aspects, the gate terminals G1, G2 of the respective first and second semiconductor switching devices 156a, 156b can be communicatively coupled to a gate driver device or circuit (not shown) that is responsive to the controller module 170.

The controller module 170 can be configured to selectively provide one or more gate signals 158a, 159a to the gate terminals G1, G2, respectively. For example, the gate signals 158a, 159a can be provided by the controller module 170 by way of the control lines 173. The first and second semiconductor switching devices 156a, 156b can be selectively operable in response to the respective gate signals 158a, 159a between an ON or conducting state, and an OFF or non-conducting state. The first and second semiconductor switching devices 156a, 156b can be alternatingly operated or switched between the ON or conducting state, and the OFF or non-conducting state at a predetermined frequency to thereby provide a sinusoidal waveform output or AC voltage at the node 154.

The first source terminal S1 of the first semi-conductor switching device 156a can be coupled to a first end (e.g., an anode end) of the capacitor C1. The second drain terminal D2 of the second semiconductor switching device 156b can be coupled to a second end (e.g., a cathode end) of the capacitor C1. In aspects, a positive DC voltage, can be provided to the first source terminal S1, and a negative DC voltage can be provided to the second drain terminal D2. In non-limiting aspects, the second drain terminal can be coupled to ground 180.

The DC-DC converter 155 can selectively operate in one of a buck mode, or a boost mode, depending on the duty cycle of the first and second semiconductor switching devices 156a, 156b and the load DC link voltage. In non-limiting aspects, for example, the first and second semiconductor switching devices 156a, 156b can enable the switching stage 156 to step up or step down the first voltage V1. The DC-DC converter 155 can operate in only one of the buck mode or boost mode at a given time.

In another non-limiting example, the EAM 140 can include a set of energy storage components, or energy "reservoirs", such as, without limitation, capacitors, inductors, or a combination thereof (not shown). In this example, the set of energy storage components can be used to cooperatively supply the first current 116 to the electrical load to supplement the second current 117 from the power source 110.

Figure 5:
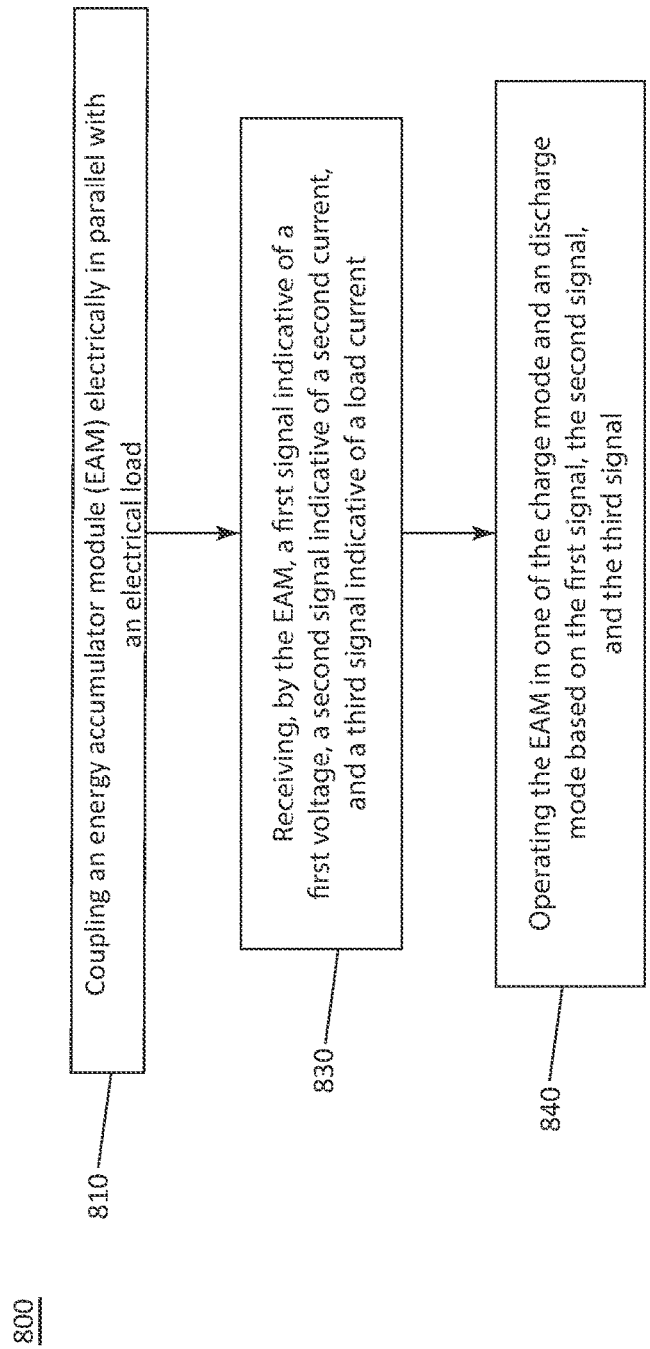
FIG. 5 is diagram of demonstrating a method of operating a power distribution system in accordance with various aspects described herein.

FIG. 5 illustrates a flow chart demonstrating a method 800 of operating a power distribution system 100, such as explained herein with respect to the EAM 140. The method 800 begins at step 810, by coupling the first transmission line 141 and the second transmission line 142 of the EAM 140 to a set of power bus coupled to an electrical load 120. The coupling the first and second transmission lines 141, 142 can include coupling the EAM 140 electrically in parallel with the electrical load 120.

The power converter 150 can include the switching stage 156. In non-limiting aspects, the switching stage 156 can include the first and second semiconductor switching devices 156a, 156b arranged to define a buck leg 159 and a boost leg 158, the buck leg 159 can be coupled in electrically series between the second transmission line 142 and the boost leg 158 at the node 154. The power converter 150 can also include the capacitor C1 coupled electrically in series between the second transmission line 142 and the boost leg 158. The EAM 140 can include an inductor L1 coupled at a first end to the first transmission line 143, and at a second end to the node 154. The EAM 140 can include the controller module 170 communicatively coupled to the switching stage 156, and communicatively coupled to the set of sensors 160. In non-limiting aspects, the controller module 170 can be coupled to the switching stage 156 via the set of control lines 173, and to the set of sensors 160 via the set of communication lines 175.

Next, the method 800 can include, at step 830, receiving, by the controller module 170, a first signal 161a indicative of a value of the first voltage V1 across the capacitor C1, a second signal 162a indicative of a value of the first current 116, and a third signal 163a indicative of a value of the load current 119.

The method 800 can continue at step 840 by controlling, by the controller module 170, an operation of the switching stage 156 based on the first signal 161a, the second signal 162a, the third signal 163a. In non-limiting aspects, the controlling an operation of the switching stage 156 can includes selectively operating the EAM 140 in one of a charge mode and a discharge mode. In some non-limiting aspects, when operating in the charge mode, the EAM 140 can be arranged to selectively provide the first current 116 to the capacitor C1. In non-limiting aspects, when operating in the discharge mode, the EAM 140 can be arranged to selectively provide the first current 116 to the electrical load 120.

The sequence depicted is for illustrative purposes only and is not meant to limit the method 800 in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. Additionally, the design and placement of the various components can be rearranged such that a number of different in-line configurations could be realized.

The aspects disclosed herein provide a method and apparatus for operating a power distribution system. The technical effect is that the above described aspects enable the power controller to regulate the DC content of the capacitor C1, and to inject AC load current to the output load using energy provided from the capacitor C1 while the average value of the capacitor C1 voltage remains regulated. This can remove the high frequency content from the load current which improves load current regulation over that of conventional techniques.

One advantage provided by the above aspects of the disclosure compared to conventional diode rectifier topology is that a simple, and lower cost, solution to improve DC power generation transient performance can be realized. Additionally, aspects as described herein provide improved efficiency over conventional active rectification techniques because the switching action of the switching portion creates losses only during the transient voltage dips or reduction. Additionally, aspects as described herein provide improved electromagnetic interference performance compared to conventional active rectification techniques because the PWM signals can be contained within the power converter enclosure. For example, for a given set of high-power transient demands, the aspects described herein minimize stress on a given power converter, or minimizes a designed or rated power characteristics of the power converter.

In another non-limiting advantage, the current disclosure allows for or enables the electrical protection from the power converter being overloaded by transient current demands, as explained herein. Thus, aspects of the disclosure can enable the power system designer to minimize the volume, weight and cost of the power converter to achieve a competitive advantage. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

1. An energy accumulator module (EAM) (140) coupleable electrically in parallel between a power source (110) and a load (120), the EAM (140) comprising: a first transmission line (141) and a second transmission line (142) coupleable to a respective power distribution bus (22) coupling the power source (110) to the load (120) to receive a DC voltage (Vr) therefrom; a power converter (150), comprising: an inductor (L1) coupled at a first end to the first transmission line (141), and at a second end to a node (154); a switching stage (156) arranged to define a buck leg (159) and a boost leg (158), the buck leg (159) and boost leg (158) electrically coupled at the node (154) and electrically in parallel with the inductor (L1), the buck leg (159) further electrically coupled to the second transmission line (142), a capacitor (C1) coupled electrically in series between the boost leg (158) and the second transmission line (142), and a controller module (170) configured to receive a first signal (161a) indicative of a first voltage (V1) across the capacitor (C1), a second signal (162a) indicative of a first current (116) through the inductor (L1), and a third signal (163a) indicative of a load current (119) in at least one of the power distribution bus (22), wherein the controller module (170) is communicatively coupled to the switching stage (156) to selectively control an operation thereof based on the first signal (161a), the second signal (162a), and the third signal (163a).

2. The EAM (140) of the preceding clause, wherein the switching stage (156) is selectively controllable by the controller module (170) to operate in one of a charge mode and a discharge mode.

3. The EAM (140) of any preceding clause, wherein, when the switching stage (156) is operating in the charge mode, the power converter (150) is arranged to provide the first current (116) to the capacitor (C1).

4. The EAM (140) of any preceding clause, wherein when the switching stage (156) is operating in in the discharge mode, the power converter (150) is arranged to provide the first current (116) from the inductor (L1) to the first transmission line (141).

5. The EAM (140) of any preceding clause, wherein when the switching stage (156) is operating in the discharge mode, the load current (119) is equal to a sum of the first current (116) and the second current (117).

6. The EAM (140) of any preceding clause, wherein when the switching stage (156) is operating in the charge mode, the first current (116) is provided to the EAM (140) through the inductor (L1).

7. The EAM (140) of any preceding clause, wherein when the switching stage (156) is operating in the charge mode, the first current (116) is equal to a difference between the load current (119) and the second current (117).

8. The EAM (140) of any preceding clause, wherein the controller module (170) is configured to controllably operate the switching stage (156) in the discharge mode when a rate of rise of the load current (119) is greater than a rate of rise of the second current (117).

9. The EAM (140) of any preceding clause, wherein the controller module (170) is configured to controllably operate the switching stage (156) in the charge mode when a rate of decrease of the load current (119) is faster greater than a rate of decrease of the second current (117).

10. The EAM (140) of any preceding clause, wherein the power converter (150) comprises a bi-directional buck-boost power converter (150).

11. A method of operating an energy accumulator module (EAM), the method comprising: coupling an energy accumulator module (EAM) (140), comprising a power converter (150) communicatively coupled to a controller module (170), electrically in parallel between a power source (110) and an electrical load (120) via a first transmission line (141) and a second transmission line (142); receiving a DC voltage at the power converter (150) from the power source (110), wherein the power converter (150) comprises an inductor (L1) coupled at a first end to the first transmission line (141), and at a second end to a node (154), a switching stage (156) arranged to define a buck leg (159) and a boost leg (158), the buck leg (159) and boost leg (158) electrically coupled at the node (154) and electrically in parallel with the inductor (L1), the buck leg (159) further electrically coupled to the second transmission line (142), and a capacitor (C1) coupled electrically in series between the boost leg (158) and the second transmission line (142); and receiving, by the controller module (170), a first signal (161a) indicative of a first voltage (V1) across the capacitor (C1), a second signal (162a) indicative of a first current (116) through the inductor (L1), and a third signal (163a) indicative of a load current (119) provided to the electrical load (120); and controlling, by the controller module (170), an operation of the switching stage (156) based on the first signal (161a), the second signal (162a), and the third signal (163a).

12. The method of any preceding clause, wherein the controlling, by the controller module (170), an operation of the switching stage (156) includes selectively operating the switching stage (156) in one of a charge mode and a discharge mode.

13. The method of any preceding clause, wherein, when the switching stage (156) is operating in the charge mode, the power converter (150) is arranged to provide the first current (116) to the capacitor (C1).

14. The method of any preceding clause, wherein when the switching stage (156) is operating in the discharge mode, the power converter (150) is arranged to provide the first current (116) from the inductor (L1) to the first transmission line (141).

15. The method of any preceding clause, wherein when the switching stage (156) is operating in the discharge mode, the load current (119) is equal to a sum of the first current (116) and the second current (117).

16. The method of any preceding clause, wherein when the switching stage (156) is operating in the charge mode, the first current (116) is provided to the EAM (140) through the inductor (L1).

17. The method of any preceding clause, wherein when the switching stage (156) is operating in the charge mode, the first current (116) is equal to a difference between the load current (119) and the second current (117).

18. The method of any preceding clause, wherein the controller module (170) is configured to controllably operate the switching stage (156) in the discharge mode when a rate of rise of the load current (119) is faster greater than a rate of rise of the second current (117).

19. The method of any preceding clause, wherein the controller module (170) is configured to controllably operate the switching stage (156) in the charge mode when a rate of decrease of the load current (119) is faster greater than a rate of decrease of the second current (117).

20. The method of any preceding clause, wherein the power converter (150) comprises a bi-directional buck-boost power converter (150).

What is claimed is:

1. An energy accumulator module (EAM) coupleable electrically in parallel between a power source and a load, the EAM comprising:
a first transmission line and a second transmission line coupleable to a respective power distribution bus coupling the power source to the load to receive a DC voltage therefrom;
a power converter, comprising:
an inductor coupled at a first end to the first transmission line, and at a second end to a node;
a switching stage arranged to define a buck leg and a boost leg, the buck leg and boost leg electrically coupled at the node and electrically in parallel with the inductor, the buck leg further electrically coupled to the second transmission line; and
a capacitor coupled electrically in series between the boost leg and the second transmission line; and
a controller module configured to receive a first signal indicative of a voltage across the capacitor, a second signal indicative of a first current through the inductor, and a third signal indicative of a load current in at least one of the respective power distribution bus, wherein the controller module is communicatively coupled to the switching stage to selectively control an operation thereof based on the first signal, the second signal, and the third signal;

wherein the switching stage is selectively controllable by the controller module to operate in one of a charge mode and a discharge mode, wherein the controller module is configured to controllably operate the switching stage in the discharge mode when a rate of rise of the load current is greater than a rate of rise of a second current in at least one of the respective power distribution bus, and wherein the controller module is configured to controllably operate the switching stage in the charge mode when a rate of decrease of the load current is greater than a rate of decrease of the second current.

2. The EAM of claim 1, wherein, when the switching stage is operating in the charge mode, the power converter is arranged to provide the first current to the capacitor.

3. The EAM of claim 1, wherein when the switching stage is operating in in the discharge mode, the power converter is arranged to provide the first current from the inductor to the first transmission line.

4. The EAM of claim 3, wherein when the switching stage is operating in the discharge mode, the load current is equal to a sum of the first current and the second current.

5. The EAM of claim 1, wherein when the switching stage is operating in the charge mode, the first current is provided to the EAM through the inductor.

6. The EAM of claim 5, wherein when the switching stage is operating in the charge mode, the first current is equal to a difference between the load current and the second current.

7. The EAM of claim 1, wherein the power converter comprises a bi-directional buck-boost power converter.

8. A method of operating an energy accumulator module (EAM), the method comprising:

coupling the EAM, comprising a power converter communicatively coupled to a controller module, electrically in parallel between a power source and an electrical load via a first transmission line and a second transmission line;

receiving a DC voltage at the power converter from the power source, wherein the power converter comprises an inductor coupled at a first end to the first transmission line, and at a second end to a node, a switching stage arranged to define a buck leg and a boost leg, the buck leg and boost leg electrically coupled at the node and electrically in parallel with the inductor, the buck leg further electrically coupled to the second transmission line, and a capacitor coupled electrically in series between the boost leg and the second transmission line; and receiving, by the controller module, a first signal indicative of a voltage across the capacitor, a second signal indicative of a first current through the inductor, and a third signal indicative of a load current provided to the electrical load; and controlling, by the controller module, an operation of the switching stage based on the first signal, the second signal, and the third signal wherein the controlling, by the controller module, an operation of the switching stage includes selectively operating the switching stage in one of a charge mode and a discharge mode, wherein the controller module is configured to controllably operate the switching stage in the discharge mode when a rate of rise of the load current is greater than a rate of rise of a second current in a power distribution bus coupled between the power source and the electrical load, and wherein the controller module is configured to controllably operate the switching stage in the charge mode when a rate of decrease of the load current is greater than a rate of decrease of the second current.

9. The method of claim 8, wherein, when the switching stage is operating in the charge mode, the power converter is arranged to provide the first current to the capacitor.

10. The method of claim 8, wherein when the switching stage is operating in the discharge mode, the power converter is arranged to provide the first current from the inductor to the first transmission line.

11. The method of claim 10, wherein when the switching stage is operating in the discharge mode, the load current is equal to a sum of the first current and the second current.

12. The method of claim 11, wherein when the switching stage is operating in the charge mode, the first current is provided to the EAM through the inductor.

13. The method of claim 8, wherein when the switching stage is operating in the charge mode, the first current is equal to a difference between the load current and a second current.

14. The method of claim 8, wherein the power converter comprises a bi-directional buck-boost power converter.

* * * * *